US012623719B2

(12) United States Patent
Cha et al.

(10) Patent No.: US 12,623,719 B2
(45) Date of Patent: May 12, 2026

(54) METHOD AND APPARATUS WITH VEHICLE CONTROL

(71) Applicant: SAMSUNG ELECTRONICS CO., LTD., Suwon-si (KR)

(72) Inventors: Hyunsoo Cha, Suwon-si (KR); Seho Shin, Suwon-si (KR); Jaehwa Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/652,276

(22) Filed: May 1, 2024

(65) Prior Publication Data

US 2025/0128718 A1 Apr. 24, 2025

(30) Foreign Application Priority Data

Oct. 19, 2023 (KR) ........................ 10-2023-0140714

(51) Int. Cl.
 *B62D 6/00* (2006.01)
 *B60W 10/20* (2006.01)
 (Continued)

(52) U.S. Cl.
 CPC ............. *B62D 6/005* (2013.01); *B60W 10/20* (2013.01); *B60W 40/10* (2013.01); *B60W 40/114* (2013.01); *B60W 50/0097* (2013.01); *B60W 50/0205* (2013.01); *B60W 50/14* (2013.01); *B60W 2050/0031* (2013.01); *B60W 2050/0063* (2013.01); *B60W 2050/021* (2013.01); *B60W 2050/146* (2013.01); *B60W 2510/207* (2013.01);
 (Continued)

(58) Field of Classification Search
None
See application file for complete search history.

(56) References Cited

U.S. PATENT DOCUMENTS 8,886,434 B2 * 11/2014 O'Dea .................. B60W 30/02
 701/72
10,577,016 B2 * 3/2020 Naik ..................... B62D 5/0484
 (Continued)

FOREIGN PATENT DOCUMENTS

CN 111532254 A * 8/2020 .......... B60W 40/105
CN 111645699 A * 9/2020 ............. G06F 18/25
 (Continued)

OTHER PUBLICATIONS

Extended European Search Report issued on Dec. 6, 2024, in counterpart European Patent Application No. 24188909.6. (11pages in English).

(Continued)

*Primary Examiner* — Kevin R Steckbauer
(74) *Attorney, Agent, or Firm* — NSIP Law

(57) ABSTRACT

A method of controlling a vehicle includes: receiving pieces of data related to steering of the vehicle; detecting, among the pieces of data, target pieces of data determined to satisfy predetermined conditions; based on the target pieces of data and an optimization model, obtaining optimized model parameters that minimize a cumulative error between a predicted yaw rate of a yaw rate model of the vehicle and a measured yaw rate of the vehicle; and updating the yaw rate model of the vehicle by using the optimized model parameters.

21 Claims, 11 Drawing Sheets

(51) Int. Cl.

| | | |
|---|---|---|
| *B60W 40/10* | (2012.01) |
| *B60W 40/114* | (2012.01) |
| *B60W 50/00* | (2006.01) |
| *B60W 50/02* | (2012.01) |
| *B60W 50/14* | (2020.01) |

(52) U.S. Cl.

CPC ... *B60W 2520/125* (2013.01); *B60W 2520/14* (2013.01); *B60W 2540/18* (2013.01); *B60W 2540/215* (2020.02)

(56) References Cited

U.S. PATENT DOCUMENTS

| | | | | |
|---|---|---|---|---|
| 11,014,569 | B2 * | 5/2021 | Ghasemalizadeh | ........................... B60W 50/0098 |
| 11,066,098 | B2 * | 7/2021 | Mitsumoto | .......... B62D 15/021 |
| 11,119,482 | B2 * | 9/2021 | Zhang | ..................... G05B 6/02 |
| 11,685,431 | B2 | 6/2023 | Al Assad et al. | |
| 2006/0058935 | A1 * | 3/2006 | Ghoneim | ............... B62D 6/003 180/408 |
| 2010/0198445 | A1 * | 8/2010 | O'Dea | ................... B60W 30/02 701/31.4 |
| 2017/0203785 | A1 * | 7/2017 | Naik | .................... B62D 5/0463 |
| 2017/0355398 | A1 * | 12/2017 | Dix | ....................... B62D 15/025 |
| 2020/0039523 | A1 * | 2/2020 | Ghasemalizadeh | .. B62D 15/025 |
| 2020/0072612 | A1 * | 3/2020 | Robinson | ............. B60W 40/114 |
| 2020/0172164 | A1 * | 6/2020 | Mitsumoto | .......... B62D 15/021 |
| 2020/0207412 | A1 * | 7/2020 | Al Assad | ........... B62D 15/0245 |
| 2020/0257291 | A1 * | 8/2020 | Zhang | ................. B60W 40/101 |
| 2020/0391726 | A1 * | 12/2020 | Qin | ................... B60W 50/0098 |
| 2025/0050850 | A1 * | 2/2025 | Karve | ................. B60T 8/17552 |
| 2025/0128718 | A1 * | 4/2025 | Cha | ...................... G01C 21/165 |
| 2025/0178664 | A1 * | 6/2025 | Kodappully | ........... B62D 6/008 |

FOREIGN PATENT DOCUMENTS

| | | | | | | |
|---|---|---|---|---|---|---|
| CN | 111645699 | B | * | 8/2021 | ............. | G06F 18/25 |
| CN | 115782888 | A | | 3/2023 | | |
| CN | 111532254 | B | * | 4/2023 | ......... | B60W 40/105 |
| CN | 116476809 | A | * | 7/2023 | ............. | B60W 30/02 |
| CN | 116981609 | A | * | 10/2023 | ............. | B60W 40/13 |
| CN | 118107559 | A | * | 5/2024 | ........ | B60W 60/0015 |
| CN | 118560458 | A | * | 8/2024 | ............... | B60L 15/20 |
| CN | 118897470 | A | * | 11/2024 | ........... | G05B 13/042 |
| CN | 119821367 | A | * | 4/2025 | | |
| CN | 119858562 | A | * | 4/2025 | ............. | B60W 40/10 |
| DE | 102020100941 | A1 | * | 8/2020 | ............. | B60W 10/20 |
| EP | 3254547 | A1 | * | 12/2017 | ........... | A01B 69/008 |
| EP | 4541695 | A1 | * | 4/2025 | ............. | B60W 40/10 |
| JP | 2007106150 | A | * | 4/2007 | | |
| KR | 10-2022-0068264 | A | | 5/2022 | | |
| KR | 20220068264 | A | * | 5/2022 | ........ | B60W 50/0098 |
| KR | 10-2023-0005668 | A | | 1/2023 | | |
| KR | 20250056706 | A | * | 4/2025 | ............. | B60W 40/10 |
| WO | WO-2021063787 | A1 | * | 4/2021 | ............. | B62D 6/04 |
| WO | WO-2021063916 | A1 | * | 4/2021 | ............. | B60W 50/04 |
| WO | WO-2021248641 | A1 | * | 12/2021 | ............. | G06F 18/25 |
| WO | WO-2024235983 | A1 | * | 11/2024 | ......... | B60W 40/103 |

OTHER PUBLICATIONS

Cha et al. "Torque vectoring control of a hybrid drive vehicle to enhance vehicle agility and stability" *Journal of Automobile Engineering* Aug. 24, 2022 (pp. 1-21).

European Office Action issued on Oct. 22, 2025, in counterpart European Patent Application No. 24188909.6 (7 pages in English).

\* cited by examiner

——— Target path <u>410</u>
------- Adjusted path <u>411</u>
— · — Driving path <u>412</u>

Kinematic model 510                    Dynamics model 520

800

METHOD AND APPARATUS WITH VEHICLE CONTROL

CROSS-REFERENCE TO RELATED APPLICATIONS

This application claims the benefit under 35 USC § 119 (a) of Korean Patent Application No. 10-2023-0140714, filed on Oct. 19, 2023, in the Korean Intellectual Property Office, the entire disclosure of which is incorporated herein by reference for all purposes.

BACKGROUND

1. Field

The following description relates to a method and apparatus with vehicle control.

2. Description of Related Art

When designing and applying steering control for a vehicle, accurate prediction of a yaw rate for a steering angle can be beneficial. Movement of the vehicle may be mostly meticulously predicted and controlled when the actual movement of the vehicle, according to a control command, is accurately predicted in terms of designing a controller. With respect to accuracy of the steering control of the vehicle by a control command, calibration may be performed on a preset steering control model in situations such as tire replacement, vehicle modification, road environment change, and so forth.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of controlling a vehicle includes: receiving pieces of data related to steering of the vehicle; detecting, among the pieces of data, target pieces of data determined to satisfy predetermined conditions; based on the target pieces of data and an optimization model, obtaining optimized model parameters that minimize a cumulative error between a predicted yaw rate of a yaw rate model of the vehicle and a measured yaw rate of the vehicle; and updating the yaw rate model of the vehicle by using the optimized model parameters.

The obtaining the optimized model parameters may include applying learning-based optimization to the yaw rate model of the vehicle to determine the optimized model parameters.

The method may further include determining whether to execute a calibration optimization system, and the determining may be based on the cumulative error between the predicted yaw rate of the vehicle and the measured yaw rate value of the vehicle.

The determining whether to execute the calibration optimization system may be based on a user input indicating that the calibration optimization system is to be executed, and the user input may be received through a user interface of the vehicle.

The method may further include updating a control model of the vehicle based on the updated yaw rate model of the vehicle.

The updating of the control model of the vehicle may include applying the updated yaw rate model to a steering wheel controller of the vehicle.

The predetermined conditions may include a lateral acceleration threshold of the vehicle and a yaw rate change threshold of the vehicle.

The pieces of data related to the steering of the vehicle may include a lateral acceleration of the vehicle, a yaw rate of the vehicle, a velocity of the vehicle, and a steering angle.

The yaw rate model may include a dynamics model or a kinematic model, either of which may be used for performing calibration corresponding to the steering of the vehicle.

The calibration may increase accuracy of predicted yaw rates used to control the steering of the vehicle.

In another general aspect, an apparatus for controlling a vehicle includes one or more processors configured to: receive pieces of data related to steering of the vehicle; detect, among the pieces of data, target pieces of data determined to satisfy predetermined conditions; based on the target pieces of data and an optimization model, obtain optimized model parameters that minimize a cumulative error between a predicted yaw rate of a yaw rate model of the vehicle and a measured yaw rate of the vehicle; and update the yaw rate model of the vehicle by using the optimized model parameters.

The one or more processors may be further configured to apply learning-based optimization to the yaw rate model of the vehicle to determine the optimized model parameters.

The one or more processors may be configured to execute an error detector configured to determine whether to execute a calibration optimization system, based on the cumulative error between the predicted yaw rate value of the vehicle and the measured yaw rate value of the vehicle.

The one or more processors may be further configured to receive, through a user interface of the vehicle, a user input indicating that the calibration optimization system is to be executed.

The one or more processors may be further configured to update a control model of the vehicle based on the updated yaw rate model of the vehicle.

The control model may include a steering wheel controller of the vehicle.

The predetermined conditions may include a lateral acceleration threshold of the vehicle and a yaw rate change threshold of the vehicle.

The pieces of data related to the steering of the vehicle may include a lateral acceleration of the vehicle, a yaw rate of the vehicle, a velocity of the vehicle, and a driver steering angle.

The yaw rate model may include a dynamics model or a kinematic model, either of which may be used for performing calibration corresponding to the steering of the vehicle.

In another general aspect, an electronic device of a vehicle includes: one or more processors; memory storing instructions configured to, when executed by the one or more processors: set a target yaw rate of the vehicle for rotational driving of the vehicle, control a yaw rate of the vehicle by using a yaw rate model of the vehicle to achieve the target yaw rate, acquire data related to autonomous steering of the vehicle, determine whether to update the yaw rate model, wherein the determination is based on a cumulative error between a predicted yaw rate of the yaw rate model and a measured yaw rate of the autonomous vehicle, and based on the determining, update the yaw rate model based on the data; a display configured to display a user interface according to the instructions; wherein the instructions are further configured to cause the one or more processors to: receive pieces of data related to the steering of the vehicle, based on determining that target pieces of data, among the pieces data, satisfy predetermined conditions, obtain optimized model parameters that minimize the cumulative error between the predicted yaw rate and the measured yaw rate, and update the yaw rate model of the autonomous vehicle by using the optimized model parameters Other features and aspects will be apparent from the following detailed description, the drawings, and the claims.

BRIEF DESCRIPTION OF THE DRAWINGS

FIG. 4 illustrates example vehicle paths related to a steering control system, according to one or more embodiments.

Figure 1:
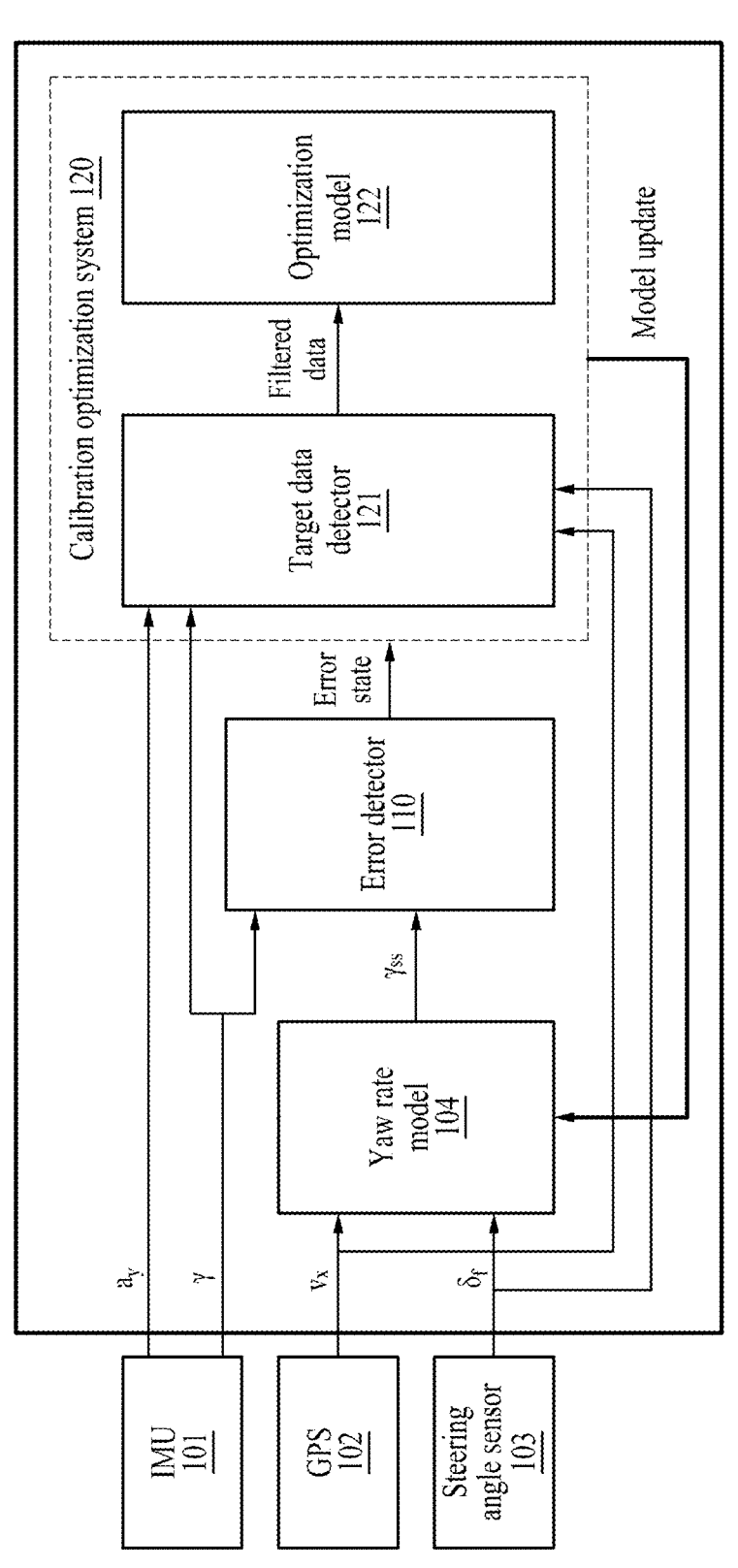
FIG. 1 illustrates an example of a steering calibration system, according to one or more embodiments.

Throughout the drawings and the detailed description, unless otherwise described or provided, the same or like drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

FIG. 1 illustrates an example of a steering calibration system according to one or more embodiments.

Referring to FIG. 1, one or more blocks and a combination thereof may be implemented by a special-purpose hardware-based computer that performs a predetermined function and/or a combination of processor-executable instructions and special-purpose hardware. The special-purpose hardware may be a general purpose processor as configured by the processor-executable instructions. The information disclosed here will suffice for one to employ hardware/software development tools to physically realize the disclosed embodiments and examples. For example, the information disclosed herein can be readily translated by an engineer or the like into source code and/or high-level circuit designs that can be translated (e.g., in the former case, by a compiler) into machine executable code or into low-level circuit configurations (e.g., in the latter case, with integrated circuit design tools).

A processor (e.g., a processor 1030 of FIG. 10) according to an embodiment may perform an operation of a steering calibration system 100 ("processor" is used herein as shorthand to refer to any combination of processing hardware, described later). The steering calibration system 100 may include a yaw rate model 104, an error detector 110, and a calibration optimization system 120.

According to one or more embodiments, the steering calibration system 100 may receive pieces of data related to the steering of a vehicle from any of a variety of sensors, for example, an inertial measurement unit (IMU) 101, a global positioning system (GPS) 102, and/or a steering angle sensor 103. The steering calibration system 100 may receive a lateral acceleration $a_y$ of the vehicle and a yaw rate $\gamma$ of the vehicle from the IMU 101. The yaw rate may be an angular velocity, for example. The steering calibration system 100 may receive a longitudinal velocity $v_x$ (velocity directly ahead) of the vehicle from the GPS 102. The steering calibration system 100 may receive a driver steering angle $\delta_{f,SW\_A}$ from the steering angle sensor 103 (e.g., an angle to which the steering wheel is turned from center), to be distinguished from the actual direction/heading of the vehicle. In places the term "driver steering angle" will be referred to as the "steering angle", which is to be distinguished from "wheel steering angle" (WSA).

According to one or more embodiments, the yaw rate model 104 may be configured to predict a yaw rate response to a steering angle of the vehicle. The yaw rate response may be a change of a yaw rate according to the steering angle of the vehicle. For example, if a steering angle is inputted to the yaw rate model 104 (among other possible inputs, e.g., forward velocity), the yaw rate model 104 may predict a change in the yaw rate. For example, a model potentially used for a steering controller of the vehicle may be a kinematic model (see Equation 6) or a dynamics model (or a bicycle model) (see Equations 1 and 2). There may be situations where the kinematic model may not accurately predict/express the movement of the vehicle. For example, a kinematic model typically does not consider an understeer characteristic of the vehicle and a tire slip of the vehicle (e.g., when making high-speed turns or turns in slippery conditions), and may be inaccurate in such conditions. However, a kinematic model may be readily used in situations where vehicle model parameters (e.g., dynamic parameters such as $C_r$ and $C_f$ discussed below) are not sufficiently known and may provide fine/precise vehicle movement prediction performance during low-speed driving. In contrast, the dynamics model may have excellent vehicle movement prediction, in particular as compared to the kinematic model. However, the dynamics model may require additional measurement equipment (that the kinematic model may not require) because the dynamics model requires the aforementioned vehicle model parameters that are not needed by the kinematic model. Thus, it may be helpful to identify when the kinematical model may be reliably used (e.g., conditions indicative of non-slippage or under/over steering). Regarding the aforementioned vehicle model parameters needed by the dynamics model but not the kinematics model, compare the dynamic model 520 in FIG. 5 to the kinematic model 510 in FIG. 5.

When the longitudinal velocity $v_x$ and the driver steering angle $\delta_{f,SW\_A}$ are input to the yaw rate model 104 in the steering calibration system 100, the yaw rate model 104 may derive/infer a model yaw rate $\gamma_{SS}$ as a predicted value ("SS" stands for "steady state").

According to an embodiment, the error detector 110 may calculate a cumulative error between the yaw rate $\gamma$ received from the IMU 101 and a model yaw rate $\gamma_{SS}$ received from a yaw rate model. For example, the error detector 110 may keep computed differences between pairs of yaw rates $\gamma$ and model yaw rate $\gamma_{SS}$ that correspond to each other in time, over a moving time window (or sample-count window) and maintain a total of the yaw differences in the moving window. The error detector 110 may determine whether calibration is necessary by using a threshold for the cumulative error. The error detector 110 may calculate the cumulative error in real time and may monitor the need for calibration, e.g., by repeatedly adding and removing differences in a set of differences included in the moving window and by correspondingly updating the total of the differences in the window, and repeatedly comparing the cumulative error to the threshold thereof. The cumulative error may also be implemented as an average error over the moving window.

Figure 1A:
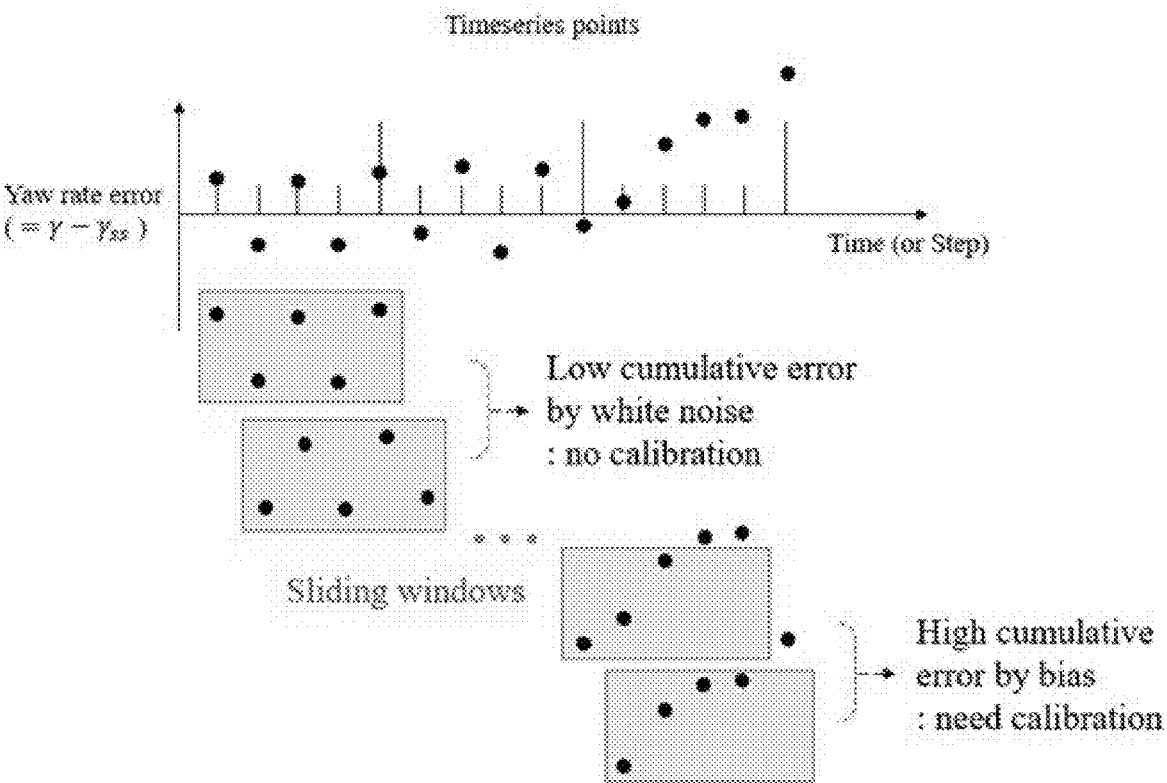
FIG. 1A shows a sliding window yaw rate error, according to one or more embodiments.

FIG. 1A shows a sliding window yaw rate error, according to one or more embodiments. As shown in FIG. 1A, the error detector 110 calculates the cumulative errors of respective sliding time windows and compares the cumulative errors to the error threshold in real time, thus allowing monitoring of whether there is a need for yaw rate model calibration. The cumulative error is utilized to distinguish the temporal error caused by white noise of sensors from the bias error due to miscalibration of the yaw rate model, since, in the cumulative error, the temporal error due to white noise is usually negligible.

According to one or more embodiments, the calibration optimization system 120 may receive a calibration request from the error detector 110, for example, based on a determination that the cumulative error has exceeded the threshold.

When receiving the calibration request, a target data detector 121 may receive pieces of driving data including the lateral acceleration $a_y$, the yaw rate $\gamma$, a velocity $v_x$, and the driver steering angle $\delta_{f,SW\_A}$. (the pieces of driving data may already be continually provided or may be sent responsive to the error detection). The received pieces of driving data may chronologically correspond to a time of the error detected by the error detector 110. The target data detector 121 may detect, among the received pieces of data, data whose values are determined (through calculations described later) to satisfy (i) a threshold for an absolute value of the lateral (sideways) acceleration $a_y$ of the vehicle and/or (ii) a threshold for an absolute value of a change (delta) of the yaw rate $\gamma$ of the vehicle (data that typically relates to under/over steering and/or lateral slippage). As described below, when these conditions are satisfied (e.g., when the vehicle has sufficiently low lateral acceleration and/or yaw rate), simplifying assumptions related to modeling of the yaw rate may be made.

According to an embodiment, an optimization model 122, which is part of the calibration optimization system 120, may obtain a parameter of the optimization model 122 which minimizes the cumulative error between (i) the measured yaw rate γ (measured by using the data received from the target data detector 121) and (ii) the predicted model yaw rate (derived from the yaw rate model 104). In this case, the optimization model 122 may obtain the parameter of the optimization model 122 through learning-based optimization, which may be performed through a genetic algorithm for example, described after some explanation of the parameters of the optimization model.

The parameters of the optimization model are parameters for updating the yaw rate model in a direction that minimizes cumulative errors. The operation of the optimization model can be explained using the following equations. To explain further, In Equation 4, p=($K_{us}$, SGR) (written below "argmin") is the optimization variable. In other words, it is the variable that can be obtained from the result through optimization. $K_{us}$ means understeer gradient, and SGR means the ratio between the driver's steering angle and the wheel angle.

In the case of the Bicycle model, the variable obtained through optimization is replaced instead of the value originally found in $K_{us}$ and SGR of Equation 3. Since the previous values of $K_{us}$ and SGR do not match the yaw rate measurement, it can be seen that the optimization is performed to match the measured value and replaced with the newly obtained $K_{us}$ and SGR.

In the case of the Kinetic model, repeat the same process assuming that $K_{us}$=0; that is, for both Equations 3 and 4, optimize to the state where $K_{us}$=0 and replace it equally For example, the processor 1030, using the steering calibration system 100, may apply the optimization model 122 to the dynamics model by using an algorithm as expressed by Equations 1 to 5. Regarding applying optimization model 122, for example, when a processor drives a steering calibration system, if the yaw rate model uses a dynamic model, the algorithm in which the optimization model performs optimization can be represented by Equations 1 through 5, described below. Before describing Equations 1 through 5, some preliminary explanation of types and features of slip models are discussed.

The front/rear tire slip angles and the sideslip angle are distinct concepts used in vehicle dynamics to describe different aspects of a vehicle's movement and orientation relative to its direction of travel. Definitions of these terms follow, along with explanation of their differences:

Front Tire Slip Angle. This is the angle between the direction in which the front tire is pointing (due to steering input) and the actual direction in which the tire is moving relative to the ground. It occurs because tires do not change direction instantaneously and there is a lateral deformation of a tire as it begins to turn.

Rear Tire Slip Angle. Similar to the front tire slip angle, this is the angle between the direction in which the rear tire is aligned and the actual direction in which the tire is moving relative to the ground. Because rear tires are not usually being directly steered, their slip angle is influenced by the vehicle's overall motion, including any yaw movement.

Sideslip Angle (B). The sideslip angle is the angle between the vehicle's heading (the direction in which it is pointed or aiming to go) and the actual path of the vehicle as it moves forward (heading of travel). This can be influenced by factors like road conditions, speed, and the vehicle's dynamics. The sideslip angle is a measure of how much the vehicle is "slipping" sideways as it moves forward.

The front and rear tire slip angles are concerned with the angles at which the tires themselves are slipping relative to their immediate direction of movement. In contrast, the sideslip angle refers to the vehicle's overall orientation relative to its path of travel.

Tire slip angles are directly influenced by steering inputs (for the front tires) and the vehicle's dynamics (for both front and rear tires), such as acceleration, deceleration, and turning. The sideslip angle can be considered an effect of these inputs and dynamics, representing the vehicle's response to them on a larger scale.

Tire slip angles help understand the behavior of tires under various steering and dynamic conditions, crucial for grip and handling. The sideslip angle offers insight into the vehicle's stability and directional control.

In summary, while the tire slip angles are specific to the orientation of the tires relative to their movement, the sideslip angle is about the vehicle's orientation relative to its overall path of travel. Each of these angles provides valuable information for analyzing and improving vehicle performance and safety.

The equations herein are shorthand description for hardware and/or machine-executable code/instructions. An engineer may readily translate the equations disclosed herein into source code, high-level circuit designs, or the like, which, using software or hardware engineering tools, may be translated into code/instructions and/or circuits that function as described by the equations.

Equation 1

(dynamics model)

$$\begin{bmatrix} \dot{\beta} \\ \dot{\gamma} \end{bmatrix} = \begin{bmatrix} -\dfrac{2(C_f + C_r)}{mv_x} & -\dfrac{2(C_f l_f - C_r l_r)}{mv_x^2} - 1 \\ -\dfrac{2(C_f l_f - C_r l_r)}{I_z} & -\dfrac{2(C_f l_f^2 - C_r l_r^2)}{I_z v_x} \end{bmatrix} \begin{bmatrix} \beta \\ \gamma \end{bmatrix}$$

where, $\dot{\beta}$ denotes a change of β (sideslip angle) and $\dot{\gamma}$ denotes a change of γ (yaw rate).

Equation 2

(steady−state dynamics model)

$$\gamma_{ss} = \frac{v_x}{L + K_{us} v_x^2} \cdot \delta_{f,WSA},$$

$$K_{us} = \frac{m(C_r l_r - C_f l_f)}{2C_f C_r L} = m\left(\frac{l_r}{2C_f L} - \frac{l_f}{2C_r L}\right),$$

Equation 3

(optimization model using dynamics model−based steady−state yaw rate model)

$$f(v_x, \delta_{f,SWA}) = \frac{v_x}{L + K_{us} v_x^2} \cdot \frac{1}{SGR} \cdot \delta_{f,SWA} = \gamma_{ss}$$

Equation 4

(optimization problem using Equation 3)

$$p^* = \operatorname*{arg\,min}_{p=(K_{us},SGR)} \sum_{i=1}^{n} [f(v_{x,i}, \delta_{f,SWA,i}) - \gamma_i]^2$$

subject to $$\underline{p} \le p \le \overline{p}$$

-continued

Equation 5

$$b' = b_0 + \text{mutation} * (\text{population}[rand0] - \text{poplution}[rand1])$$

Figure 5:
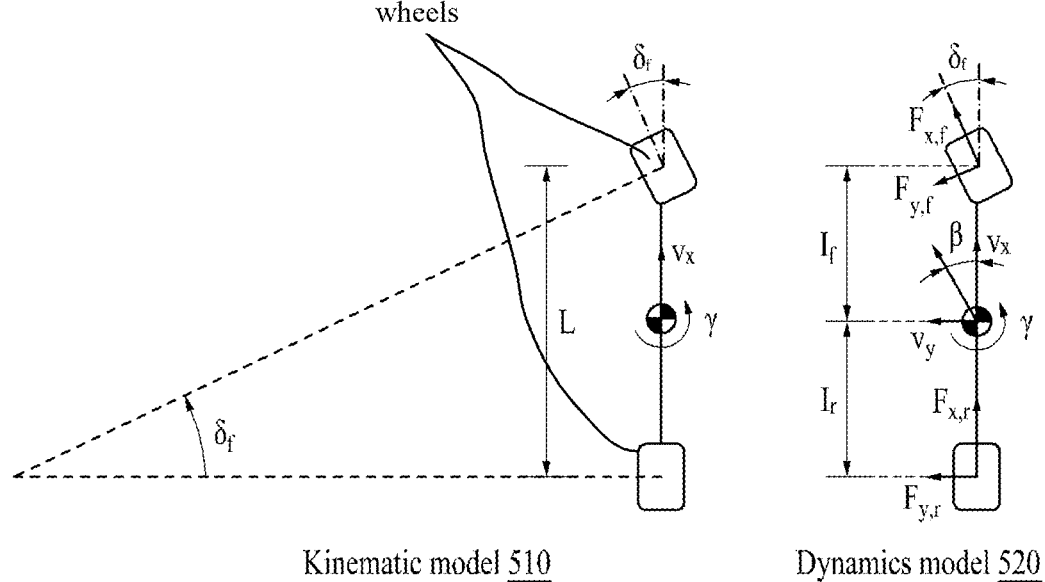
FIG. 5 illustrates an example of a kinematic model and a dynamics model, according to one or more embodiments.

Equation 1 may expresses an implementation of the dynamics model (e.g., a dynamics model 520 of FIG. 5). Considered with reference to FIG. 7 and description thereof, a state of the dynamics model 520 may be defined by a sideslip angle β and the yaw rate γ. The sideslip angle β is an angle between a heading (forward-pointing direction) of the vehicle and the actual movement direction of the vehicle. The yaw rate γ is the rate of rotation around the z-axis of the vehicle. Various vehicle model parameters may include some of the following parameters. A front tire cornering stiffness $C_f$ may be a front tire lateral force ratio, Fy=$C_f$*front tire slip angle, formed by a front tire slip angle (discussed shortly). A rear tire cornering stiffness $C_r$ is a rear tire lateral force ratio, Fy=$C_r$*rear tire slip angle, formed by a rear tire slip angle. m denotes a total mass of the vehicle. $v_x$ denotes the longitudinal velocity $v_x$ of the vehicle. $I_z$ denotes a rotational inertia around the z-axis of the vehicle. $I_f$ denotes a distance from the center of mass of the vehicle to a front tire axle. $I_r$ denotes a distance from the center of mass of the vehicle to a rear tire axle. As per above, $\delta_{f,WSA}$ denotes a wheel steering angle of the vehicle.

$\gamma_{SS}$ may be provided by Equation 2, which expresses a steady-state dynamics model when β̇=0 and γ̇=0. Again, Ø denotes a change of β and γ̇ denotes a change of γ. L denotes a distance from the front tire axle to the rear tire axle. $K_{us}$ is an instantaneous ratio (rate) of the wheel steering angle $\delta_{f,WSA}$ changing with respect to the lateral acceleration $a_y$ and corresponds to an instantaneous change of the wheel steering angle with respect to a lateral acceleration. $K_{us}$ is described in detail below with reference to FIG. 6.

Before addressing Equation 3, some description of various steering angles slip angles is provided.

The front and rear tire slip angles and the sideslip angle are distinct concepts used in vehicle dynamics to describe different aspects of a vehicle's movement and orientation relative to its direction of travel. Some explanations of these terms and their differences follow.

Front Tire Slip Angle. This is the angle between the direction in which the front tire is pointing (due to steering input) and the actual direction in which the tire is moving relative to the ground. It occurs because tires do not change direction instantaneously and there is a lateral deformation of the tire as it begins to turn.

Rear Tire Slip Angle. Similar to the front tire slip angle, this is the angle between the direction in which the rear tire is aligned and the actual direction in which the tire is moving relative to the ground. Rear tires, not being directly steered, have their slip angle influenced by the vehicle's overall motion, including any yaw movement.

Sideslip Angle (β). The sideslip angle is the angle between the vehicle's heading (the direction in which it is pointed or aiming to go) and the actual path of the vehicle as it moves forward. This can be influenced by factors like road conditions, speed, and the vehicle's dynamics. The sideslip angle is a measure of how much the vehicle is "slipping" sideways as it moves forward.

The front and rear tire slip angles are concerned with the angles at which the tires themselves are slipping relative to their immediate direction of movement. In contrast, the sideslip angle refers to the vehicle's overall orientation relative to its path of travel.

Tire slip angles are directly influenced by steering inputs (for the front tires) and the vehicle's dynamics (for both front and rear tires), such as acceleration, deceleration, and turning. The sideslip angle can be considered an effect of these inputs and dynamics, representing the vehicle's response to them on a larger scale.

Tire slip angles help understand the behavior of tires under various steering and dynamic conditions, crucial for grip and handling. The sideslip angle offers insight into the vehicle's stability and directional control.

In summary, while the tire slip angles are specific to the orientation of the tires relative to their movement, the sideslip angle is about the vehicle's orientation relative to its overall path of travel. Each of these angles provides valuable information for analyzing and improving vehicle performance and safety.

Steering and wheel angles are discussed next.

Driver Steering Angle. This term refers to the angle at which the steering wheel is turned by the driver. It reflects the driver's input or command to change the vehicle's direction. This angle is directly measurable and can be used to understand the driver's intention for vehicle movement. It is a critical parameter in vehicle dynamics, driver assistance systems, and autonomous vehicle control algorithms, as it directly influences the vehicle's trajectory and handling characteristics.

The Driver Steering Angle and the Steering Wheen Angle (SWA) (addressed next) are effectively the same, as both represent the driver's direct input into the vehicle's steering system to achieve the desired direction of travel. This parameter is key for analyzing steering behavior and implementing control strategies in various automotive applications.

SWA (Steering Wheel Angle). This term refers to the angle by which the driver turns the steering wheel. It is a direct measure of the driver's input to steer the vehicle. The SWA is a measurable quantity and represents how much the driver intends to turn the vehicle. This angle is crucial for understanding the vehicle's intended direction of motion and is often used in vehicle dynamics studies and driver assistance systems to predict or control vehicle behavior.

WSA (Wheel Steering Angle). This term refers to the actual angle of the wheels relative to the vehicle's longitudinal axis. It is the effective angle that results in the direction of the tire's movement during steering. Unlike the SWA, the WSA is not usually directly measured but is rather calculated or estimated from other measurable quantities due to its direct impact on the vehicle's trajectory. The WSA determines how the vehicle actually moves in response to the steering input and affects the vehicle's handling characteristics.

In dynamics modeling and control systems, since WSA and SWA are usually linearly related, it is common to convert WSA to SWA (or vice versa) using a Steering Gear Ratio (SGR) or other vehicle-specific parameters. This conversion is necessary because SWA is a measurable parameter that can be directly used in optimization and control algorithms, while WSA may not be directly measurable but is crucial for understanding and influencing the vehicle's steering behavior.

So, Equation 3 used for optimization uses SGR to convert $\delta_{f,WSA}$ values to $\delta_{f,SWA}$ (because WSA is measurable).

Equation 3 expresses the optimization model 122 by using a dynamics model-based steady-state yaw rate model, which is close to the model of Equation 2, but using (i) a steering gear rate (SGR) (a ratio between the driver steering angle $\delta_{f,SWA}$ and the wheel steering angle $\delta_{f,WSA}$, and using (ii) the driver steering angle $\delta_{f,SWA}$ rather than the wheel steering angle $\delta_{f,WSA}$. For example, when a driver rotates a steering wheel at 450 degrees and a front wheel rotates at 30 degrees, the SGR may be calculated as 15.

Equation 4 defines an optimization problem whose solution minimizes a sum of yaw rate error accumulations with respect to data. The processor 1030 may perform a learning-based optimization algorithm as described by Equation 4, in which n denotes the number of data to be applied to the optimization model 122, $\underline{p}$ denotes the lower limit of an optimization variable, and $\bar{p}$ denotes the upper limit of the optimization variable, which may be set based on a range of the SGR or $K_{us}$ of a general vehicle. For example, $\underline{p}$ may be set to '$K_{us}$: 0.0030<rad/(m/s^2)>', SGR: 10<dimensionless number>', and $\bar{p}$ may be set to '$K_{us}$: 0.0060<rad/(m/s^2)>, SGR: 20<dimensionless number>'.

Equation 5 describes a genetic algorithmic equation to obtain an optimal solution of the optimization problem of Equation 4. An algorithm to obtain the optimal solution of Equation 4 is not limited to the described embodiment; an optimal solution may be obtained by using other algorithms (e.g., a particle swarm optimization algorithm or a Levenberg-Marquardt algorithm).

The steering calibration system 100 may apply an obtained parameter of the optimization model 122 to the yaw rate model 104 and may update the yaw rate model 104. The obtained parameter may be an instantaneous ratio (rate) at which the wheel steering angle $\delta_{f,WSA}$ changes with respect to lateral acceleration ($a_y$). Essentially, $K_{us}$ quantifies how the steering angle of the wheels (WSA) changes in response to lateral forces acting on the vehicle, which are directly related to how the vehicle handles understeer conditions.

Understeer is a condition in a vehicle's handling characteristics where the vehicle tends to steer less than, or "under," the amount commanded by the driver. This typically happens when the front wheels do not have enough grip to execute the turn at the desired rate, causing the vehicle to continue in a straighter line than intended.

The concept of $K_{us}$ is crucial for understanding and optimizing vehicle dynamics, especially in the context of designing control systems that aim to improve handling and stability. By adjusting parameters such as the steering gear ratio (SGR) and taking into account the understeer coefficient ($K_{us}$), engineers can develop systems that better predict and control the vehicle's behavior under various driving conditions, enhancing safety and performance.

In summary, $K_{us}$ is a parameter that reflects the vehicle's steering responsiveness and stability, particularly under conditions of lateral acceleration, and is used in the optimization of vehicle dynamics models and control systems.

Figure 2:
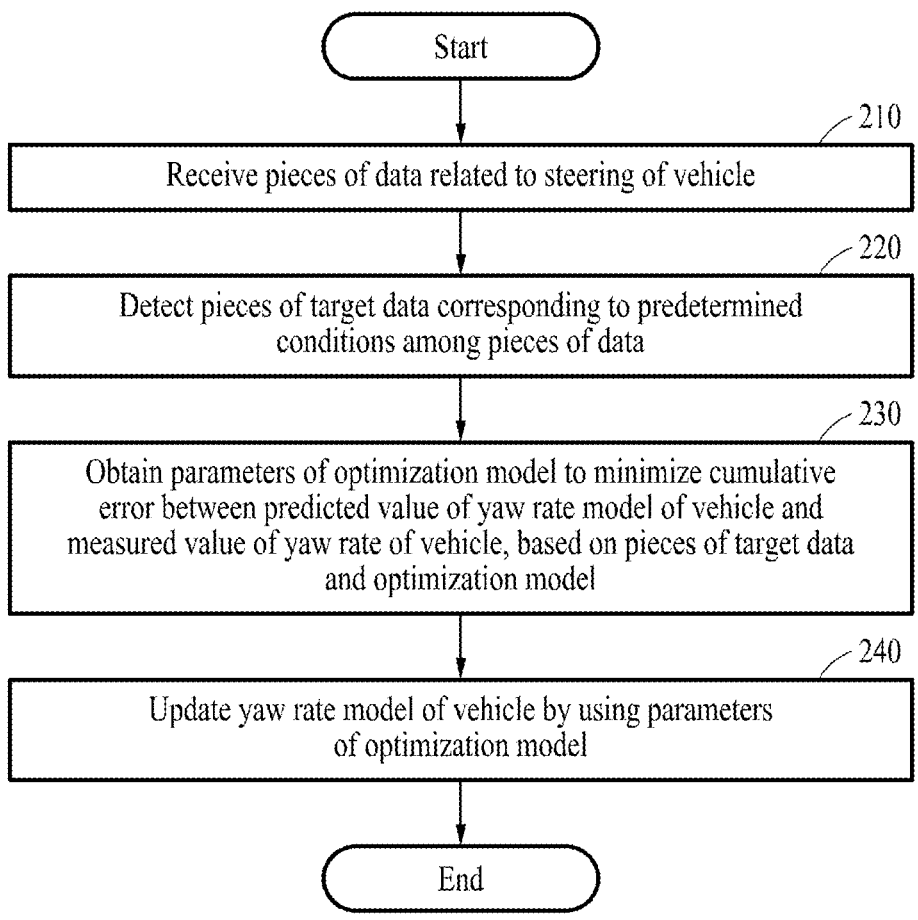
FIG. 2 illustrates example operations of a steering calibration system, according to one or more embodiments.

FIG. 2 illustrates example operations of a steering calibration system according to one or more embodiments.

Figure 10:
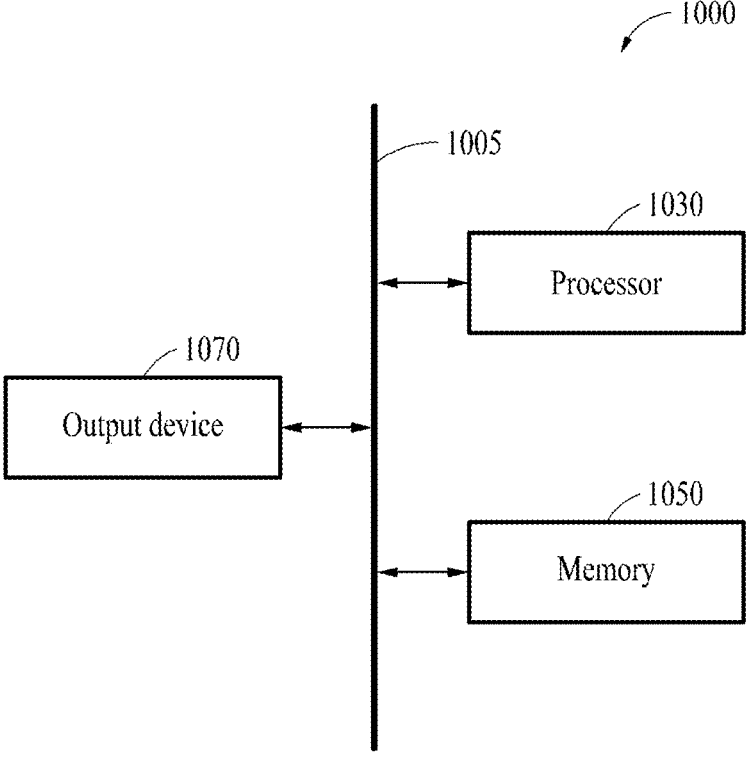
FIG. 10 illustrates an example of an electronic device, according to one or more embodiments.

Although operations 210 to 240 are described as being performed by an electronic device 1000 illustrated in FIG. 10, operations 210 to 240 may be performed by another suitable electronic device in any suitable system.

The description provided with reference to FIG. 1 is generally applicable to FIG. 2.

According to one or more embodiments, the processor 1030 may determine whether to automatically execute/activate the calibration optimization system 120 based on a cumulative error between predicted values of the yaw rate model 104 (associated with steering a vehicle) and measured yaw rate values of the vehicle. Alternatively, the processor 1030 may receive an input indicating that calibration is to be performed from a driver of the vehicle through an interface (e.g., a vehicle interface 130 of FIG. 3) of the vehicle. The vehicle interface 130 is described below with reference to FIG. 3.

In operation 210, the processor 1030 may receive pieces of data related to the actual steering of the vehicle. The pieces of data related to the steering of the vehicle may include an acceleration (e.g., the lateral acceleration $a_y$, of FIG. 1) of the vehicle, a yaw rate $\gamma$ of the vehicle, a velocity (e.g., the longitudinal velocity $v_x$ of FIG. 1) of the vehicle, and a driver steering angle $\delta_{f,SWA}$. The pieces of data may be provided by the IMU 101, GPS, 102, the steering angle sensor 103, for example.

Figure 3:
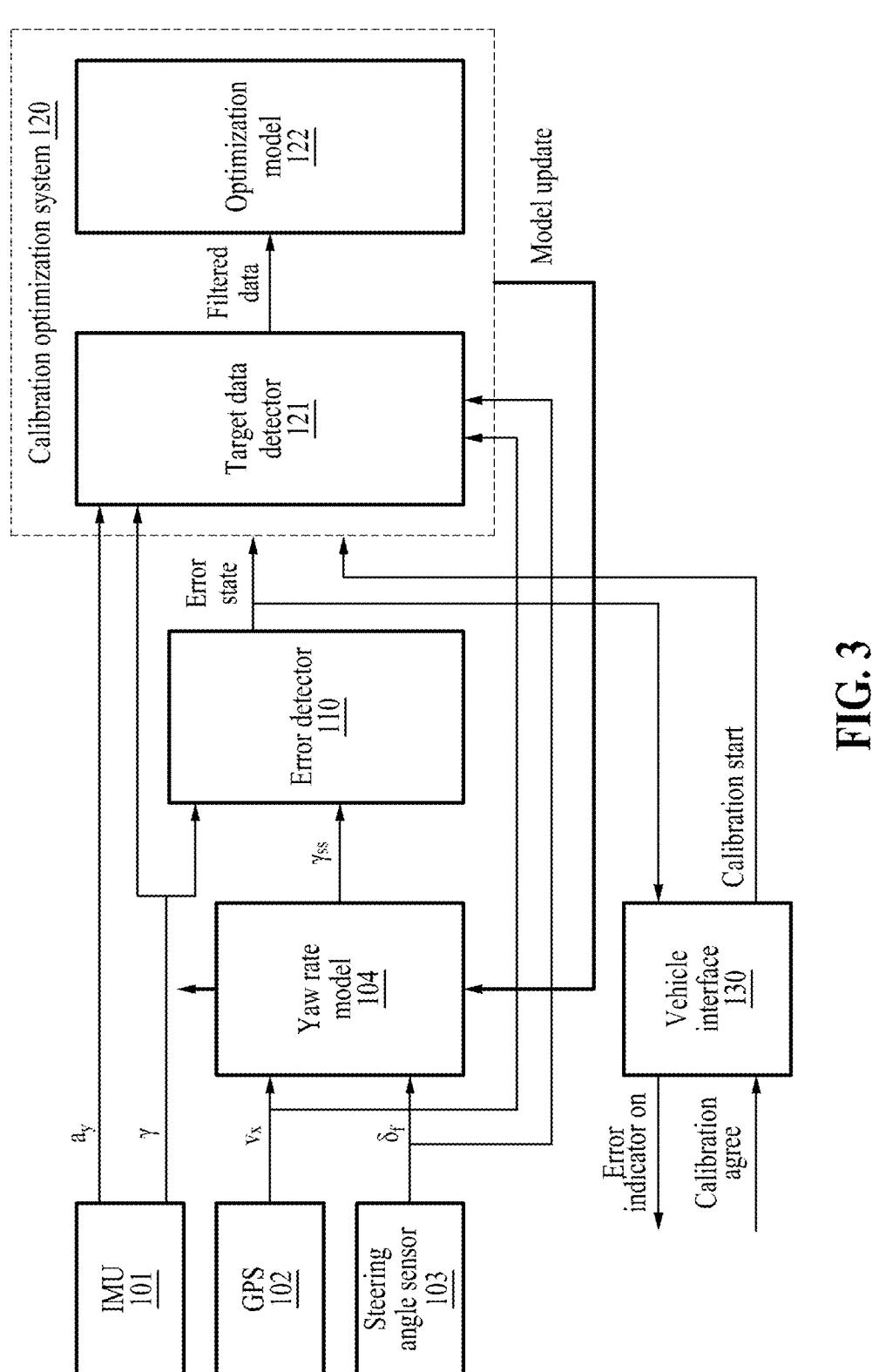
FIG. 3 illustrates an example of the steering calibration system, according to one or more embodiments.

In operation 220, the processor 1030 may detect/select, from among the pieces of data, target pieces of data corresponding to (e.g., satisfying) predetermined conditions. The detected/selected target pieces of data may also be referred as filtered data (as shown in FIGS. 1 and 3). The predetermined conditions may include a threshold condition of the lateral acceleration of the vehicle and a threshold condition of a change in the yaw rate of the vehicle. Generally, the predetermined conditions may relate to how "hard" the vehicle is turning or whether sideslip or over/under steering is likely. The selecting of target pieces of data is also described with reference to FIG. 6.

In operation 230, the processor 1030 may obtain parameters of the optimization model 122 that minimize the cumulative error between the predicted value of the yaw rate model 104 of the vehicle and the measured value of the yaw rate of the vehicle. The parameters may be obtained by the optimization model 122 based on the target pieces of data. The yaw rate model 104 may include at least one of a dynamics model and/or a kinematic model and may be used for performing calibration corresponding to the steering of the vehicle. That is, yaw rate changes outputted by the yaw rate model 104 may be used (e.g., by a steering controller).

Regarding the functional role of the yaw rate change outputted by the yaw rate model 104, some explanation of the yaw rate and the yaw rate model 104 is provided next, and then description of FIG. 2 resumes. Yaw Rate Model Functionality.

Prediction of Yaw Rate Changes: The yaw rate model 104 predicts changes in the vehicle's yaw rate based on various inputs, including the driver steering angle $\delta_{f,SWA}$, vehicle speed ($v_x$), and potentially other factors like vehicle load, road conditions, and lateral acceleration ($a_y$). This prediction helps in understanding how the vehicle will respond to steering inputs, which is highly useful for maintaining control and stability during maneuvers.

Steering Control System Calibration: The yaw rate model 104 is used within the steering calibration system to calibrate the steering control. Calibration involves adjusting the parameters of the steering control system so that the actual vehicle behavior (in terms of yaw rate response to steering inputs) matches the desired or predicted behavior as closely as possible. This process can involve adjusting software parameters within the steering control algorithm or even hardware adjustments in some cases.

Returning to FIG. 2, the processor 1030 may obtain the parameters of the optimization model 122 by applying learning-based optimization to the yaw rate model 104 of the vehicle (thus updating the yaw rate model 104 to reduce the difference between the measured and the yaw rate predicted by the yaw rate model 104).

In operation 240, the processor 1030 may update the yaw rate model 104 of the vehicle by using the parameters of the optimization model 122. The processor may update a control model of the processor 1030 of the vehicle, based on the updated yaw rate model 104. For example, the processor 1030 may apply the updated yaw rate model 104 to a steering wheel controller of the vehicle. This is described in detail below with reference to FIG. 8.

Regarding the "parameters of the optimization model 122" mentioned immediately above, this refers to the variables or coefficients within the model that are adjusted or optimized to minimize the cumulative error between the measured yaw rate (γ) received from sensors (like the IMU 101) and the predicted yaw rate ($\gamma_{SS}$) output by the yaw rate model 104. These parameters are key to the calibration process, as they can ensure that the vehicle's steering response as predicted by the yaw rate model closely matches the actual steering response observed through sensor data.

Regarding the statement above that "the processor 1030 may update the yaw rate model 104 of the vehicle by using the parameters of the optimization model 122", this refers to the processor using the optimized parameters—found through the calibration optimization process—to refine or adjust the yaw rate model. This adjustment helps improve the accuracy of the model's predictions, leading to better steering control and vehicle handling.

Regarding the outputs of the model 122, this refers to the specific values for parameters like the Steering Gear Ratio (SGR) and the Instantaneous Understeer Coefficient ($K_{us}$), which are determined through the optimization process to minimize the error between the predicted and actual yaw rates. These outputs are the "optimized parameters" that directly influence how the yaw rate model predicts the vehicle's response to steering inputs.

Regarding weights of the model 122, in the context of optimization and calibration models like model 122, the term "weights" refers to parameters that are adjusted (e.g., SGR and $K_{us}$) to align the model's predictions with real-world data.

In sum, the phrase above, "parameters of the optimization model 122", most directly refers to the optimized values of variables within the model that are adjusted to reduce prediction error. These optimized parameters are then applied to update the yaw rate model 104, enhancing its accuracy and reliability for steering control applications.

FIG. 3 illustrates an example of the steering calibration system according to one or more embodiments.

The description provided with reference to FIGS. 1 and 2 is generally applicable to FIG. 3.

According to an embodiment, the processor 1030 may display a signal (e.g., a user interface element) for allowing a person to confirm whether to execute the calibration optimization system 120. The signal/user interface element may be displayed on the vehicle user interface (a human-machine interface (HMI), e.g., a touch-based interface) 130 responsive to a determination that a calibration may be needed. Such a determination may be in response to vehicle conditions such as tire replacement, vehicle modification, or road environment change. A determination to calibrate may also be driven by a signal from the error detector 110, indicating that execution of the calibration optimization system 120 is necessary. In any case, when a calibration is in order, calibration may be confirmed by a person (e.g., a driver) providing an input confirming execution of the calibration optimization system 120 through the vehicle user interface 130 (e.g., an electronic device, such as a display or an audio, built into the vehicle). The processor 1030 may receive the input confirming execution of the calibration optimization system 120 through the vehicle user interface 130 and may respond by operating the calibration optimization system 120.

The vehicle user interface 130 may be provided by the vehicle itself. For example, the vehicle user interface 130 may be provided by an operating system (OS) of the vehicle or may be provided by an application installed in the vehicle. In addition, the vehicle interface 130 may be provided by a server, in which the vehicle may simply receive and display the vehicle interface 130 provided by the server.

As described above calibration may be driven by the processor 1030 determining that the cumulative error between the predicted value of the yaw rate model 104 of the vehicle and the measured value of the yaw rate of the vehicle exceeds a predetermined threshold (e.g., a threshold of 3 degrees per second (deg/s)). In this case, the processor 1030 may determine that the execution of the calibration optimization system 120 is necessary and may notify the driver as described above through the vehicle user interface 130. However the determination of calibration execution is made, the vehicle user interface 130 may display a reason why the execution of the calibration optimization system 120 is necessary together with a situation, such as tire replacement, vehicle modification, or road environment change. On the other hand, when the driver decides that there is a change in a vehicle environment, the driver may initiate calibration by inputting a signal to the vehicle user interface 130 that executes the calibration optimization system 120. In this case, the processor 1030 may receive the input signal from the vehicle interface 130 and may execute the calibration optimization system 120.

FIG. 4 illustrates example vehicle paths of a steering control system according to one or more embodiments.

The processor 1030 may set a yaw rate (e.g., in a steering wheel controller) according to a target path 410 for the rotational movement of a vehicle 420 (the target path 410 may be the intended path of travel of the vehicle, as determined by an autonomous driving system for example). However, due to a vehicle environment change, when setting the yaw rate to a yaw rate provided by the yaw rate model 104 (predicted by using current/recent data), without calibration the vehicle 420 might drive along a driving path 412 that significantly differs from the target path 410. However, the vehicle 420 may drive along an adjusted path 411 much closer to the target path 410 when the processor 1030 (i) calibrates the yaw rate model 104 such that a cumulative error between a predicted value of the yaw rate model 104 according to the target path 410 and a measured value of a yaw rate according to the driving path 412 is minimized and (ii) uses the yaw rate of the updated yaw rate model 104 to set the yaw rate of the vehicle (e.g., of the steering wheel controller).

FIG. 5 illustrates an example of a kinematic model and a dynamics model according to one or more embodiments.

The description provided with reference to FIGS. 1 to 4 is generally applicable to FIG. 5.

A kinematic model 510 may be implemented as expressed by Equation 6. The kinematic model 510 may model the whole vehicle rotating around a pivot point where a normal of a rear wheel meets a normal of a front wheel under the assumption that the vehicle moves like one rigid body (here, the "normal" is the line that is perpendicular to the direction of the front wheel and the line that is perpendicular to the direction of the rear wheel, i.e., the direction of the axis of rotation).

$$\gamma_{ss} = \frac{v_x}{L} \cdot \delta_f, \qquad \text{Equation 6}$$

The steering calibration system 100 described with reference to FIG. 1 may be to a dynamics model 520 in similar fashion to the kinematic model 510. $\gamma_{SS}$ of Equation 6 expresses the kinematic model 510 in a steady state according to $\beta=0$, $\bar{\gamma}=0$.

Equation 7 expresses the optimization model 122 in a steady state based on the kinematic model 510.

$$f(v_x, \delta_f) = \frac{v_x}{L} \cdot \frac{1}{SGR} \cdot \delta_f = \gamma_{ss} \qquad \text{Equation 7}$$

According to one or more embodiments, the dynamics model 520 is described in detail above with reference to FIG. 1.

Figure 6:
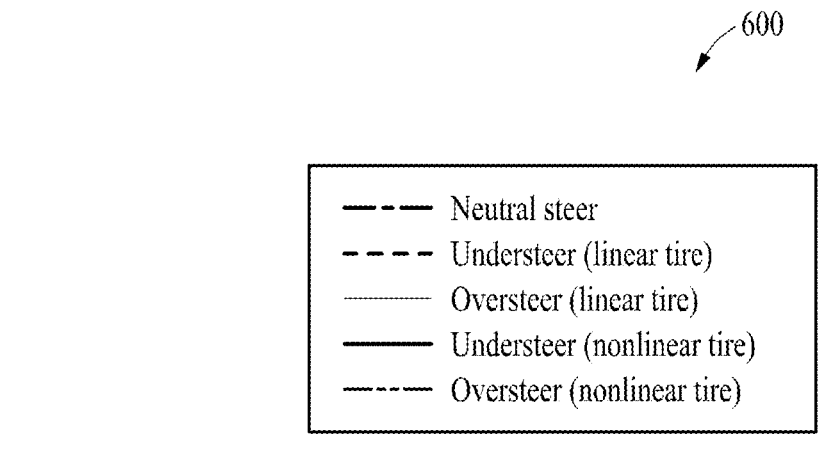
FIG. 6 illustrates example of relationships between steering angles and later accelerations for different conditions of a target data detector, according to one or more embodiments.
Figure 6:
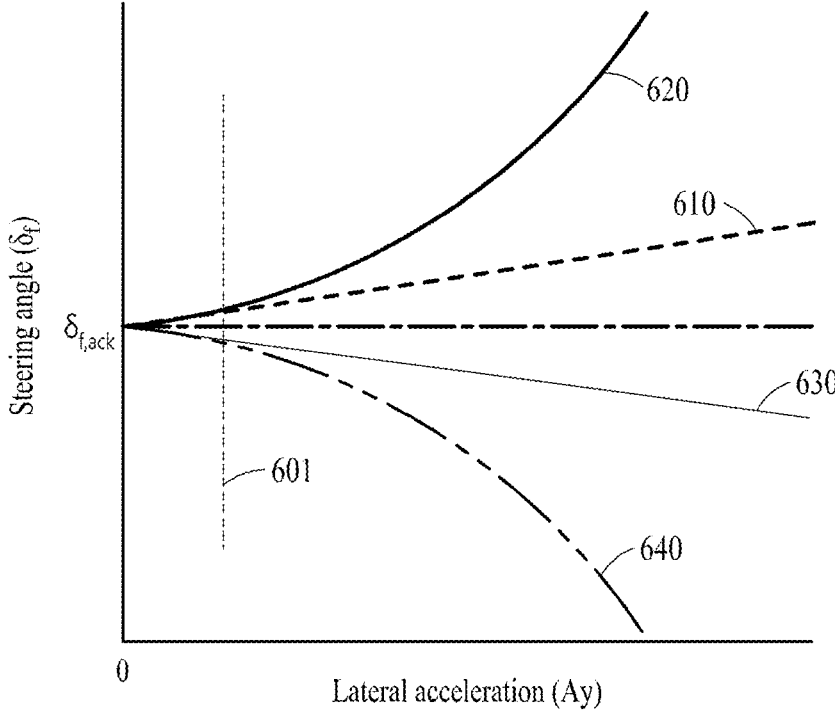

FIG. 6 illustrates an example of relationships between steering angles and lateral accelerations for different conditions of a target data detector, according to one or more embodiments.

The description provided with reference to FIGS. 1 and 2 is generally applicable to FIG. 6.

According to one or more embodiments, data from the IMU 101, the GPS 102, and/or the steering angle sensor 103, for example (control/measure components), may flow through the target data detector 121. The target data detector 121 may filter/detect target pieces of data that correspond to predetermined conditions among the pieces of data from the control/measure components related to steering of a vehicle. The predetermined conditions may include a threshold condition of a lateral acceleration $a_y$ of the vehicle and a threshold condition of a change of a yaw rate of the vehicle. The threshold condition of the lateral acceleration $a_y$ is described with reference to graph 600.

Graph 600 illustrates an understeer curve produced by the dynamics model 520. In the graph 600, the x-axis represents the lateral acceleration $a_y$ and the y-axis represents the wheel steering angle $\delta_{f,WSA}$ (note that "f,ack" in FIG. 6 is another term for $\delta_{f,WSA}$, that is, the y-axis is for $\delta_{f,WSA}$). Relative to graph 600, $K_{us}$ is an instantaneous gradient of the wheel steering angle $\delta_{f,WSA}$ as a function of the lateral acceleration $a_y$. $K_{us}$ is expressed by Equation 2 described above.

Before discussing the graph 600, some discussion of $K_{us}$ and its properties follows. $K_{us}$ is the slope of the graph 600. So, when $a_y$ is low enough (e.g., less than 0.7 g), it means that $K_{us}$ can be defined as a constant. In description below of graph 600 and the behavior of $K_{us}$ under different steering situations, $K_{us}$ may be treated as a constant in both linear understeer and oversteer situations due to its constant gradient with respect to lateral acceleration ($a_y$). The change in the wheel steering angle ($\delta_{f,WSA}$) in relation to $a_y$ (lateral acceleration) can be approximated by a constant value in scenarios where a linear tire model is applicable.

Therefore, discussion herein of $K_{us}$ in relation to $a_y$ pertains to the direct relationship between the steering angle change and lateral acceleration within the context of vehicle dynamics modeling. $K_{us}$, in this scenario, represents a coefficient or parameter that describes this relationship under specific conditions (like understeer and oversteer modeled linearly), and $a_y$ is the variable that $K_{us}$ is being compared against or related to in the analysis.

Returning to FIG. 6, in graph 600, $K_{us}$ may be effectively treated as a constant when (and because) $K_{us}$ has a constant gradient in (i) an understeer situation (hereinafter, referred to as a linear understeer situation 610) to which a linear tire model is applied and in (ii) an oversteer situation (hereinafter, referred to as a linear oversteer situation 630) to which the linear tire model is applied. In other words, in the linear understeer situation 610, $K_{us}$ may be treated as a constant because the wheel steering angle $\delta_{f,WSA}$ increases constantly with respect to the lateral acceleration $a_y$. On the other hand, $K_{us}$ may have the shape of a nonlinear graph not having a constant gradient in (i) an understeer situation (hereinafter, referred to as a nonlinear understeer situation 620) to which a nonlinear tire model is applied and in (ii) an oversteer situation (hereinafter, referred to as a nonlinear oversteer situation 640) to which the nonlinear tire model is applied. In other words, in the nonlinear understeer situation 620, $K_{us}$ may not be treated as a constant because $K_{us}$ increases nonlinearly as the lateral acceleration $a_y$ increases.

The nonlinear tire model shows that a require steering angle increases nonlinearly as the lateral acceleration $a_y$ increases in a rotation situation (i.e., when yaw is changing). The linear tire model shows that the required steering angle increases linearly as the lateral acceleration $a_y$ increases in the rotation situation. The nonlinear understeer situation 620 is generally the response of most actual vehicles (during automated steering). In addition, the nonlinear oversteer situation 640 is generally the response when the vehicle slides sideways, such as in a drift turn (e.g., at high speed or on a slippery surface). However, when the lateral acceleration $a_y$ is sufficiently low, $K_{us}$ may be defined as a constant in all four situations, namely, the linear understeer situation 610, the nonlinear understeer situation 620, the linear oversteer situation 630, and the nonlinear oversteer situation 640. As shown in graph 600, when the lateral acceleration $a_y$ is less than or equal to a certain level 601, $K_{us}$ may be defined as a constant under the assumption that $K_{us}$ increases approximately constantly when the lateral acceleration $a_y$ is less than the certain value 601, in both the linear understeer situation 610 and in the nonlinear understeer situation 620. In addition, when the lateral acceleration $a_y$ is less than or equal to the certain level 601, $K_{us}$ may be defined as a constant under the assumption that $K_{us}$ decreases approximately constantly in both the linear oversteer situation 630 and in the nonlinear oversteer situation 640. In an example implementation, $K_{us}$ may be defined as a constant when the absolute value of the lateral acceleration $a_y$ is less than or equal to 0.7 acceleration of gravity (g). This technique may be used in the target data detector 121. As the target data detector 121 is evaluating/filtering the pieces of data from the IMU 101 (for example), it may detect the pieces of target data when the lateral acceleration $a_y$ is less than or equal to 0.7 g by setting a threshold of the lateral acceleration $a_y$ of the vehicle to 0.7 g. The value of 0.7 g is only an example; the certain level 101 may be set to various values based on the number of data, the performance of the steering calibration system 100, or the like.

The size of $\dot{\gamma}$ may need to be sufficiently small to satisfy the assumption $\beta=0$, $\dot{\gamma}=0$ in Equation 2 described above. Because $\dot{\gamma}$ is the absolute value of the change of the yaw rate, the target data detector 121 may detect pieces of data satisfying a threshold condition where the change of the yaw rate is sufficiently small. A method of calculating $\dot{\gamma}$ is to use the Kalman filter of Equations 8 to 10 below and differentiate a measured value of a yaw rate including noise (as sampled at time steps). $\delta_t$ is a sampling rate, for example, every 0.010 seconds (sec). z(k) is a measure value of a kth step. X(k) is a state of the kth step.

$$x(k + 1) = A_d x(k), \qquad \text{Equation 8}$$

$$z(k + 1) = H_d x(k + 1)$$

$$\text{where} \qquad \text{Equation 9}$$

$$x(k) = [\, \gamma(k) \quad \dot{\gamma}(k) \quad \ddot{\gamma}(k) \,]^T,$$

$$z(k + 1) = \gamma(k),$$

$$A_d = \begin{bmatrix} 1 & \Delta t & \Delta t^2/2 \\ 0 & 1 & \Delta t \\ 0 & 0 & 1 \end{bmatrix}, \qquad \text{Equation 10}$$

$$H_d = [\, 1 \quad 0 \quad 0 \,].$$

In summary, the target data detector 121 may detect a driver steering angle $\delta_{f,SWA}$, a longitudinal velocity $v_x$, and a yaw rate $\gamma$ with respect to data simultaneously satisfying the conditions of (i) the absolute value of the lateral acceleration $a_y$ being less than or equal to the threshold (e.g., 0.7 g) of the lateral acceleration $a_y$ and (ii) the absolute value of the change of the yaw rate being less than or equal to the threshold (e.g., 5 deg/s²) of the change of the yaw rate. The data simultaneously satisfying the conditions may be selected as the pieces of target data.

Figure 7:
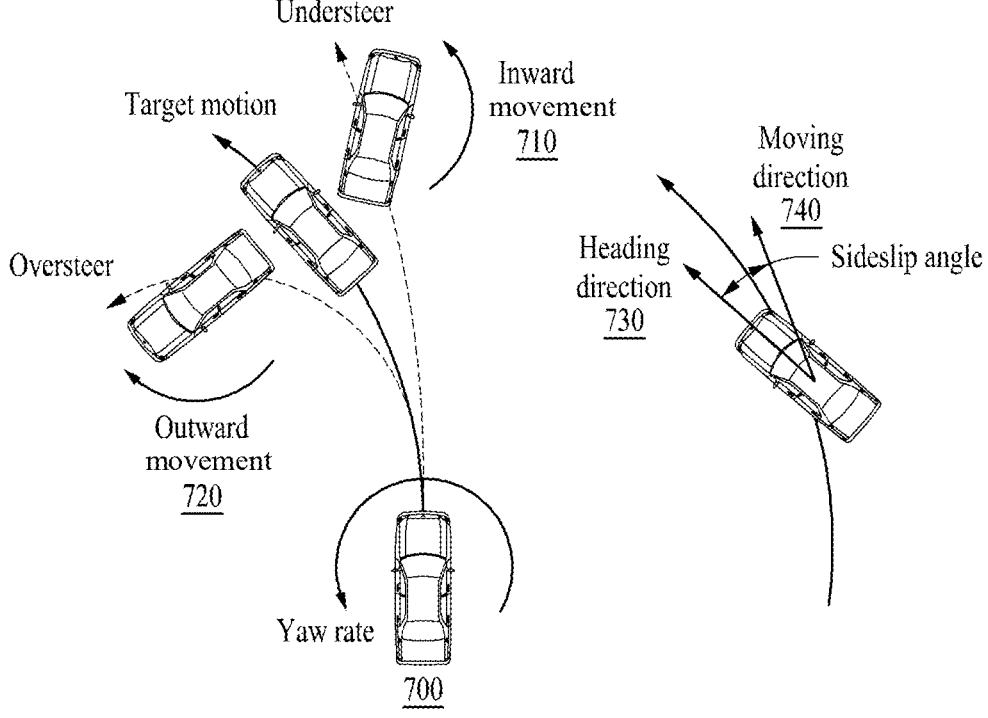
FIG. 7 illustrates an example of an operation of the dynamics model, according to one or more embodiments.

FIG. 7 illustrates an example of an operation of the dynamics model according to one or more embodiments.

The description provided with reference to FIG. 1 is generally applicable to FIG. 7. Before discussing FIG. 7, some explanation of "movement" and "moment" is provided. In the context of FIG. 7, the terms "inward/outward moment" refer to the yaw moment required to address understeer and oversteer conditions. This represents the torque around the yaw axis necessary for correction. In contrast the terms "inward movement" and "outward movement" relate to the correction of the vehicle's orientation.

Referring to FIG. 7, a traveling direction of a vehicle 700 may vary depending on a yaw rate and a sideslip angle. An inward movement 710 may be the traveling direction of the vehicle 700 in an understeer situation and an outward movement 720 may be the traveling direction of the vehicle 700 in an oversteer situation. In addition, the sideslip angle may be calculated in a heading direction 730 of the vehicle 700 of Equation 1 and a moving direction 740 of the vehicle 700.

Figure 8:
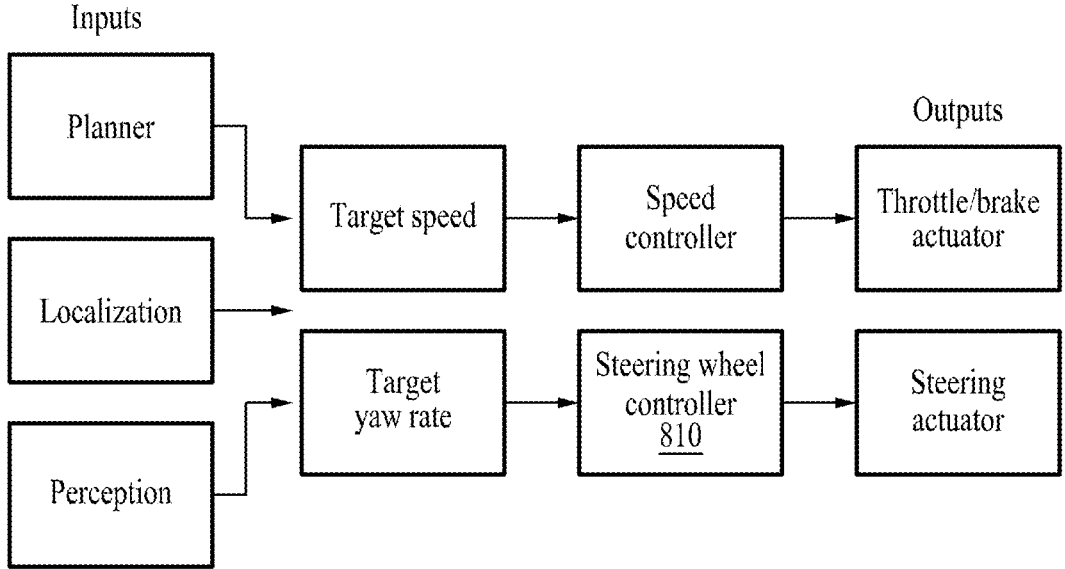
FIG. 8 illustrates an example of a controller of a vehicle, according to one or more embodiments.

FIG. 8 illustrates an example of a controller of a vehicle according to one or more embodiments. The vehicle may be operating in an autonomous driving mode, a driver-assist mode, or the like. That is, the controller may be partly or fully controlling operation of the vehicle.

The description provided with reference to FIGS. 1 to 7 is generally applicable to FIG. 8.

According to one or more embodiments, a controller 800 of a vehicle may include one or more processors 1030.

The controller 800 of the vehicle may use information received from a planner, a localization unit, and a perception unit as an input. However, the planner, the localization unit, and the perception unit may also be included in the controller 800 of the autonomous vehicle. The controller 800 may control steering of the vehicle (i.e., may be/include a steering controller).

The controller 800 of the vehicle may include, for example, one of or a combination of two or more of hardware, software, and firmware. The controller 800 may be interchangeably used with terms, such as, for example, a unit, a logic, a logical block, a component, or a circuit. The controller 800 may be a minimum unit of an integrally formed component or a part thereof. The controller 800 may be a minimum unit for performing one or more functions or a part thereof. For example, the controller 800 may include any one or any combination of an application-specific integrated circuit (ASIC) chip, field-programmable gate arrays (FPGAs), or a programmable-logic device that performs known operations or operations to be developed.

The controller 800 of the autonomous vehicle may receive a target path, a target velocity, and/or a target yaw rate from the planner, may receive information, such as a current position (an x, y position) of the vehicle or a posture (a heading angle) of the vehicle, and may receive information on the position and size of surrounding objects from the perception unit. The vehicle may be operating in an autonomous mode or in a driver-assist mode, for example.

The controller 800 of the vehicle may determine a command value of a deceleration/acceleration actuator and a steering actuator to follow the target velocity and the target yaw rate by using the received information.

If the yaw rate model 104 to be applied to a steering wheel controller 810 is inaccurate, an error may be caused when generating a steering angle corresponding to the target yaw rate (resulting in a discrepancy between the planned travel path and the actual travel path of the vehicle). Accordingly, the controller 800 of the autonomous vehicle may use the yaw rate model 104 as updated by execution of the calibration optimization system 120 (per an update received from the steering calibration system 100) and may calculate the steering angle for generating the target yaw rate in a way that keeps the actual travel path closer to the planned travel path.

Figure 9:
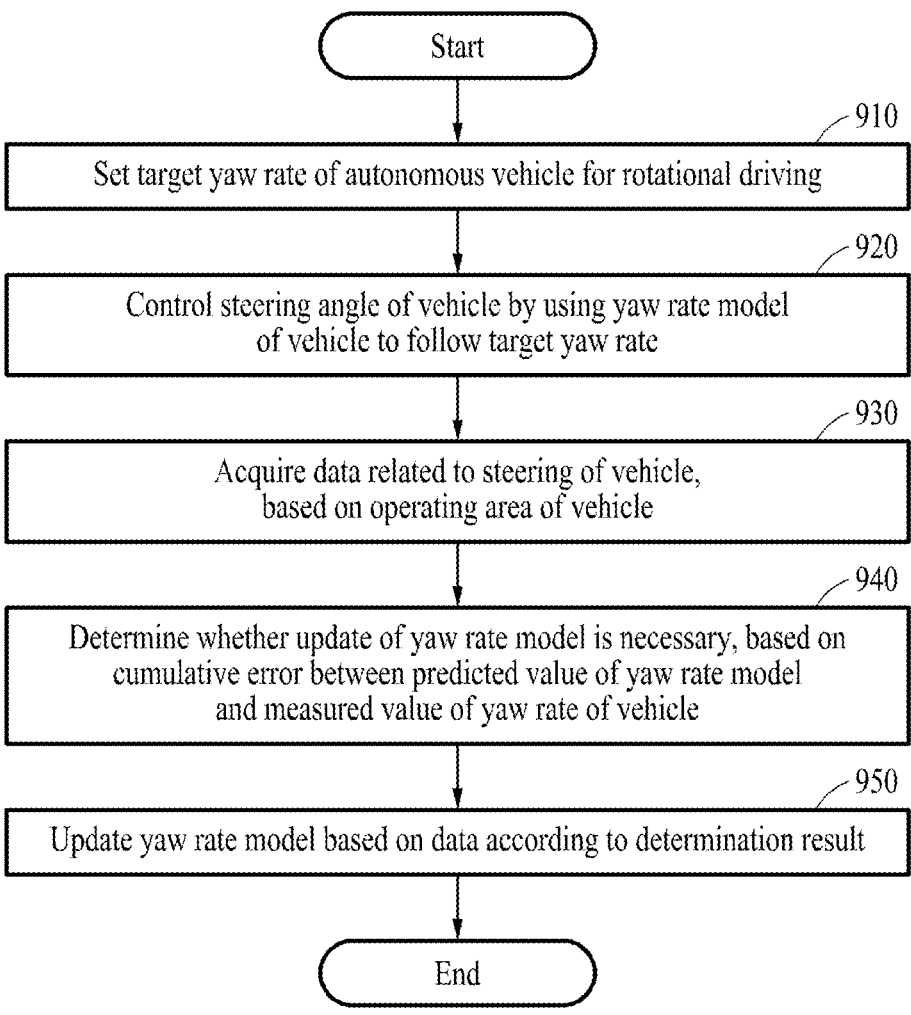
FIG. 9 illustrates an example of an operation of the vehicle, according to one or more embodiments.

FIG. 9 illustrates an example of an operation of the vehicle, according to one or more embodiments.

The description provided with reference to FIGS. 1 to 8 is generally applicable to FIG. 9. For ease of description, operations 910 to 950 are described as performed by the controller 800. However, operations 910 to 950 may be performed by another suitable electronic device in any suitable system.

In operation 910, the vehicle may set a target yaw rate of the autonomous vehicle for rotational driving.

In operation 920, the vehicle may control a steering angle of the vehicle by using the yaw rate model 104 of the autonomous vehicle to follow the target yaw rate.

In operation 930, the autonomous vehicle may acquire data related to the steering of the autonomous vehicle based on an operating area of the autonomous vehicle (e.g., an area where $K_{us}$ can be treated as a constant, i.e., $a_y{<}0.7$ g).

In operation 940, the autonomous vehicle may determine whether an update of the yaw rate model 104 is necessary, based on, for example, a cumulative error between a predicted yaw rate value predicted by the yaw rate model 104 and a measured yaw rate value.

In operation 950, the autonomous vehicle may update the yaw rate model 104 based on data (e.g., steering angle, velocity, and yaw rate), and may do so according to a determination result of operation 940.

FIG. 10 illustrates an example of an electronic device, according to one or more embodiments. Referring to FIG. 10, an electronic device 1000 may include a processor 1030, a memory 1050, and an output device 1070 (e.g., a display). The processor 1030, the memory 1050, and the output device 1070 may be connected to one another through a communication bus 1005.

The output device 1070 may display a user interface configured to enable a user to control whether to execute a calibration optimization system provided by the processor 1030.

The memory 1050 may store the yaw rate model 104 updated by the processor 1030. In addition, the memory 1050 may store various pieces of information generated in the process of the processor 1030 described above. In addition, the memory 1050 may store various pieces of data, programs, and the like. The memory 1050 may include a volatile memory and/or a non-volatile memory (but not a signal per se). The memory 1050 may include a storage medium such as a hard disk, and store the various pieces of data.

In addition, the processor 1030 may perform at least one method described with reference to FIGS. 1 to 9 or an algorithm corresponding to the at least one method. The processor 1030 may be a data processing device implemented by hardware including a circuit having a physical structure to perform desired operations. For example, the desired operations may include code or instructions in a program. The processor 1030 may be implemented as, for example, a central processing unit (CPU), a graphics processing unit (GPU), or a neural network processing unit (NPU). The hardware-implemented electronic device 1000 may include, for example, a microprocessor, a central processing unit (CPU), a processor core, a multi-core processor, a multiprocessor, an application-specific integrated circuit (ASIC), and a field-programmable gate array (FPGA).

The processor 1030 may execute a program and control the electronic device 1000. The code of the program executed by the processor 1030 may be stored in the memory 1050.

The computing apparatuses, the vehicles, the electronic devices, the processors, the memories, the image sensors, the vehicle/operation function hardware, the autonomous/assisted driving systems, the displays, the information output system and hardware, the storage devices, and other apparatuses, devices, units, modules, and components described herein with respect to FIGS. 1-10 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-10 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EE-PROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. A method of controlling a vehicle, the method comprising:
   receiving pieces of data related to steering of the vehicle;
   selecting, from among the pieces of data, a subset of the pieces of data, which are target pieces of data selected based on determining that they to satisfy predetermined conditions;
   based on the target pieces of data and an optimization model, optimizing model parameters that-determined, based on a cumulative error, to minimize the cumulative error between a predicted yaw rate of a yaw rate model of the vehicle and a measured yaw rate of the vehicle, wherein the cumulative error is determined based on multiple pieces of yaw rate error of respective different times; and
   updating the yaw rate model of the vehicle by using the optimized model parameters.

2. The method of claim 1, wherein the obtaining the optimized model parameters comprises applying learning-based optimization to the yaw rate model of the vehicle to determine the optimized model parameters.

3. The method of claim 1, further comprising determining whether to execute a calibration optimization system, the determining based on the cumulative error between the predicted yaw rate of the vehicle and the measured yaw rate value of the vehicle.

4. The method of claim 3, wherein the determining whether to execute the calibration optimization system is based on a user input indicating that the calibration optimization system is to be executed, the user input received through a user interface of the vehicle.

5. The method of claim 1, further comprising updating a control model of the vehicle based on the updated yaw rate model of the vehicle.

6. The method of claim 5, wherein the updating the control model of the vehicle comprises applying the updated yaw rate model to a steering wheel controller of the vehicle.

7. The method of claim 1, wherein the predetermined conditions comprise a lateral acceleration threshold of the vehicle and a yaw rate change threshold of the vehicle.

8. The method of claim 1, wherein the pieces of data related to the steering of the vehicle comprise a lateral acceleration of the vehicle, a yaw rate of the vehicle, a velocity of the vehicle, and a steering angle.

9. The method of claim 1, wherein the yaw rate model comprises a dynamics model or a kinematic model, either of which are used for performing calibration corresponding to the steering of the vehicle.

10. The method of claim 9, wherein the calibration increases accuracy of predicted yaw rates used to control the steering of the vehicle.

11. An apparatus for controlling a vehicle, the apparatus comprising:
   one or more processors configured to:
      receive pieces of data related to steering of the vehicle,
      select, from among the pieces of data, a subset of the pieces of data, which are target pieces of data selected based on determining that they to satisfy predetermined conditions,
      based on the target pieces of data and an optimization model, optimizing model parameters determined, based on a cumulative error to minimize the cumulative error wherein the cumulative error is an error between a predicted yaw rate of a yaw rate model of the vehicle and a measured yaw rate of the vehicle, and wherein the cumulative error is determined based on multiple pieces of yaw error of respective different times, and
      update the yaw rate model of the vehicle by using the optimized model parameters.

12. The apparatus of claim 11, wherein the one or more processors are further configured to apply learning-based optimization to the yaw rate model of the vehicle to determine the optimized model parameters.

13. The apparatus of claim 11, wherein the one or more processors are configured to execute an error detector configured to determine whether to execute a calibration optimization system, based on the cumulative error between the predicted yaw rate value of the vehicle and the measured yaw rate value of the vehicle.

14. The apparatus of claim 13, wherein the one or more processors are further configured to receive, through a user interface of the vehicle, a user input indicating that the calibration optimization system is to be executed.

15. The apparatus of claim 11, wherein the one or more processors are further configured to update a control model of the vehicle based on the updated yaw rate model of the vehicle.

16. The apparatus of claim 15, wherein the control model comprises a steering wheel controller of the vehicle.

17. The apparatus of claim 11, wherein the predetermined conditions comprise a lateral acceleration threshold of the vehicle and a yaw rate change threshold of the vehicle.

18. The apparatus of claim 11, wherein the pieces of data related to the steering of the vehicle comprise a lateral acceleration of the vehicle, a yaw rate of the vehicle, a velocity of the vehicle, and a driver steering angle.

19. The apparatus of claim 11, wherein the yaw rate model comprises a dynamics model or a kinematic model, either of which are used for performing calibration corresponding to the steering of the vehicle.

20. An electronic device of a vehicle, the electronic device comprising:
    one or more processors;
    memory storing instructions configured to, when executed by the one or more processors:
        set a target yaw rate of the vehicle for rotational driving of the vehicle,
        control a yaw rate of the vehicle by using a yaw rate model of the vehicle to achieve the target yaw rate,
        acquire data related to autonomous steering of the vehicle, based on data related to steering the vehicle satisfying a predetermined condition,
        determine whether to update the yaw rate model, wherein the determination is based on a cumulative error between a predicted yaw rate of the yaw rate model and a measured yaw rate of the autonomous vehicle, and
        based on the determining, update the yaw rate model based on the data;
    a display configured to display a user interface according to the instructions;
    wherein the instructions are further configured to cause the one or more processors to:
        receive pieces of data related to the steering of the vehicle,
        based on determining that target pieces of data, among the pieces data, satisfy predetermined conditions, optimize model parameters that are determined, based on the cumulative error to, minimize the cumulative error between the predicted yaw rate and the measured yaw rate, wherein the cumulative error comprises a statistic computed from yaw rate errors of respective different times, and
        update the yaw rate model of the autonomous vehicle by using the optimized model parameters.

21. The electronic device according to claim 20, wherein the data related to steering comprises an understeer gradient of the vehicle.

* * * * *